United States Patent
Cheng et al.

(10) Patent No.: US 9,519,380 B2
(45) Date of Patent: Dec. 13, 2016

(54) HANDWRITING SYSTEMS AND OPERATION METHODS THEREOF

(71) Applicant: PixArt Imaging Inc., Hsinchu (TW)

(72) Inventors: Han-Ping Cheng, Hsinchu (TW); Shu-Sian Yang, Hsinchu (TW)

(73) Assignee: PIXART IMAGING INC., Hsinchu (TW)

( * ) Notice: Subject to any disclaimer, the term of this patent is extended or adjusted under 35 U.S.C. 154(b) by 0 days.

(21) Appl. No.: 14/876,820

(22) Filed: Oct. 7, 2015

(65) Prior Publication Data

US 2016/0026339 A1 Jan. 28, 2016

Related U.S. Application Data

(62) Division of application No. 13/663,470, filed on Oct. 30, 2012, now abandoned.

(30) Foreign Application Priority Data

Dec. 22, 2011 (TW) .............................. 100147978 A

(51) Int. Cl.
*G06F 3/042* (2006.01)
*G06F 3/045* (2006.01)

(52) U.S. Cl.
CPC ............. *G06F 3/0425* (2013.01); *G06F 3/045* (2013.01)

(58) Field of Classification Search
CPC .................. G06F 3/045; G06F 3/042–3/0428; G06K 7/10603; H03K 17/78; H03K 17/941; H03K 17/968; H03K 17/9627
See application file for complete search history.

(56) References Cited

U.S. PATENT DOCUMENTS

| 6,421,042 B1 | 7/2002 | Omura et al. |
| 2001/0030642 A1 | 10/2001 | Sullivan et al. |

(Continued)

FOREIGN PATENT DOCUMENTS

| CN | 101324922 | 12/2008 |
| CN | 101382868 | 3/2009 |

(Continued)

OTHER PUBLICATIONS

Yao-De Chiu, "Virtual Multi-touch Screen Visual Hand Tracking by Single Camera", Thesis for Master of Science Department of Computer Science and Engineering Tatung University, Aug. 2009, Taiwan.

*Primary Examiner* — Liliana Cerullo
(74) *Attorney, Agent, or Firm* — Chieh-Mei Wang

(57) ABSTRACT

A handwriting system includes a light source module, an image sensing apparatus and a processing circuit. The light source module is configured to provide a light source to illuminate an object on a plane. The image sensing apparatus is disposed on the plane and configured to capture an image of the object reflecting light emitted by the light source. The processing circuit is electrically connected to the image sensing apparatus and configured to receive the image captured by the image sensing apparatus, analyze the shape of each of light spot(s) in the captured image and screen out the light spot(s) not conforming to the shape of the object. Another handwriting system and two handwriting system operation methods are also provided.

11 Claims, 5 Drawing Sheets

(56) References Cited

U.S. PATENT DOCUMENTS

| | | | |
|---|---|---|---|
| 2003/0218760 A1* | 11/2003 | Tomasi | G06F 1/1626 356/614 |
| 2004/0252091 A1 | 12/2004 | Ma et al. | |
| 2008/0018599 A1 | 1/2008 | Chang | |
| 2008/0303786 A1 | 12/2008 | Nakamura et al. | |
| 2009/0161190 A1* | 6/2009 | Obara | G02B 26/105 359/198.1 |
| 2009/0316431 A1 | 12/2009 | Nagata et al. | |
| 2010/0193259 A1 | 8/2010 | Wassvik | |
| 2010/0194713 A1* | 8/2010 | Kawashima et al. | G06F 3/042 345/175 |
| 2010/0231532 A1 | 9/2010 | Nho et al. | |
| 2011/0007029 A1 | 1/2011 | Ben-David | |
| 2011/0194097 A1 | 8/2011 | Yamaguchi et al. | |
| 2011/0210943 A1* | 9/2011 | Zaliva | G06F 3/0414 345/174 |

FOREIGN PATENT DOCUMENTS

| | | |
|---|---|---|
| CN | 101667058 | 3/2010 |
| CN | 101901084 | 12/2010 |
| CN | 102129332 | 7/2011 |
| TW | 200614098 A | 5/2006 |
| TW | 200742600 A | 11/2007 |
| TW | 201140111 A | 11/2011 |

\* cited by examiner

HANDWRITING SYSTEMS AND OPERATION METHODS THEREOF

CROSS-REFERENCE TO RELATED APPLICATION

The present application is a division of U.S. application Ser. No. 13/663,470, filed on Oct. 30, 2012, and now pending. The entirety of the above-mentioned patent application is hereby incorporated by reference herein and made a part of this specification.

FIELD OF THE INVENTION

The present invention relates to the touch technique field, and more particularly to handwriting systems and operation methods thereof.

BACKGROUND OF THE INVENTION

In the sensing technique of a conventional handwriting system (e.g., a virtual handwriting pad), the sensed objects may not be recognized correctly due to the background light source interference resulted from the varying of operational environments. In other words, the conventional handwriting system may have a performance easily affected by the background light.

In addition, because the operational environment (e.g., a table's top surface) may vary, the predetermined operation zone (i.e., a virtual input zone) of the conventional handwriting system may not be always convenient for users. For example, users may feel inconvenient to operate the conventional handwriting system if the table's top surface (specifically, the predetermined operation zone) associated with the handwriting system is disorder.

SUMMARY OF THE INVENTION

The present invention provides a handwriting system minimally influenced by background light sources.

The present invention also provides an operation method of the aforementioned handwriting system minimally influenced by background light sources.

The present invention further provides a handwriting system with an adjustable operation zone, thus minimizing influences caused by the operation environment.

The present invention still further provides an operation method of the aforementioned handwriting system with an adjustable operation zone.

The present invention provides a handwriting system, which includes a light source module, an image sensing apparatus and a processing circuit. The light source module is configured to provide a light source to illuminate an object on a plane. The image sensing apparatus is disposed on the plane and configured to capture an image of the object reflecting lights emitted by the light source. The processing circuit is electrically connected to the image sensing apparatus and configured to receive the image captured by the image sensing apparatus, analyze the shape of each of light spot(s) in the captured image and screen out the light spot(s) not conforming to the shape of the object.

The present invention also provides an operation method of a handwriting system. The handwriting system includes a light source module, an image sensing apparatus and a processing circuit. The light source module is configured to provide a light source to illuminate an object on a plane. The image sensing apparatus is disposed on the plane and configured to capture an image of the object reflecting lights emitted by the light source. The operation method includes the steps of: obtaining the image captured by image sensing apparatus; analyzing the shape of each of light spot(s) in the captured image; and screening out the light spot(s) not conforming to the shape of the object.

In the embodiment of the handwriting system and the operation method thereof, the captured image is converted into a binary image and the binary image is analyzed to determine if the binary image contains any light spot conforming to the shape of the object by using the Hough Transform.

The present invention further provides a handwriting system, which includes a light source module, an image sensing apparatus and a processing circuit. The light source module is configured to provide a light source to illuminate at least one object on a plane. The image sensing apparatus is disposed on the plane and configured to capture an image of the object(s) reflecting lights emitted by the light source. The processing circuit is electrically connected to the image sensing apparatus, and is configured to receive the image captured by the image sensing apparatus and calculate the position of a single object relative to the plane according to image characteristics and imaging position of a single light spot contained in the captured image. When operating in an operation zone converting mode, the processing circuit is further configured to define an indicated operation zone according to at least two positions sequentially inputted by an object, and map a predetermined operation zone of the handwriting system onto the indicated operation zone through performing a coordinate transformation by using a matrix operation.

The present invention still further provides an operation method of a handwriting system. The handwriting system includes a light source module, an image sensing apparatus and a processing circuit. The light source module is configured to provide a light source to illuminate at least one object on a plane. The operation method includes the steps of: obtaining the image captured by the image sensing apparatus; if the captured image has a single light spot therein, calculating the position of a single object relative to the plane according to image characteristics and imaging position of the single light spot in the captured image; and when the handwriting system operates in an operation zone converting mode, defining an indicated operation zone according to at least two positions sequentially inputted by one object, and mapping a predetermined operation zone of the handwriting system onto the indicated operation zone through performing a coordinate transformation by using a matrix operation.

In the embodiment of the operation method, the operation method further includes the steps of: if the captured image has a plurality of light spots therein, calculating the positions of a plurality of objects relative to the plane according to image characteristics and imaging position of the light spots in the captured image; and when the handwriting system operates in the operation zone converting mode, defining the indicated operation zone according to four positions sequentially inputted by two separate objects, wherein the two objects each are associated with two positions.

In the embodiment of the operation method, the operation method further includes the steps of: if the captured image has a plurality of light spots therein, calculating the positions of a plurality of objects relative to the plane according to image characteristics and imaging position of the light spots in the captured image; and when the handwriting system operates in an operation zone converting mode, defining the indicated operation zone according to four positions inputted by four separate objects simultaneously.

In the embodiment of the operation method, the matrix operation includes a homogeneous matrix operation.

In summary, the processing circuit of the handwriting system according to the present invention first analyzes the shape of each of the light spot(s) in the image captured by the image sensing apparatus and screens out the light spot(s) not conforming to the shape of the object. Therefore, the handwriting system of the present invention is minimally affected by background light sources. In addition, if the captured image has a single light spot therein, the processing circuit would further calculate the position of a single object relative to the plane according to the image characteristics and imaging position of the single light spot; alternatively, if the captured image has a plurality of light spots therein, calculates the positions of a plurality of objects relative to the plane according to the image characteristics and imaging positions of the light spots. Specifically, the handwriting system operating in an operation zone converting mode defines an indicated operation zone according to four positions; wherein the four positions are sequentially inputted by one single object, or by two separate objects and each of the two objects is associated with two positions, or inputted simultaneously by four separate objects. Thereafter, a coordinate transformation is performed on a predetermined operation zone by using a matrix operation, so as to map the predetermined operation zone onto the indicated operation zone. Therefore, the handwriting system of the present invention contains an adjustable operation zone that is minimally affected by the operational environments.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

First Embodiment of the Present Invention

Figure 1:
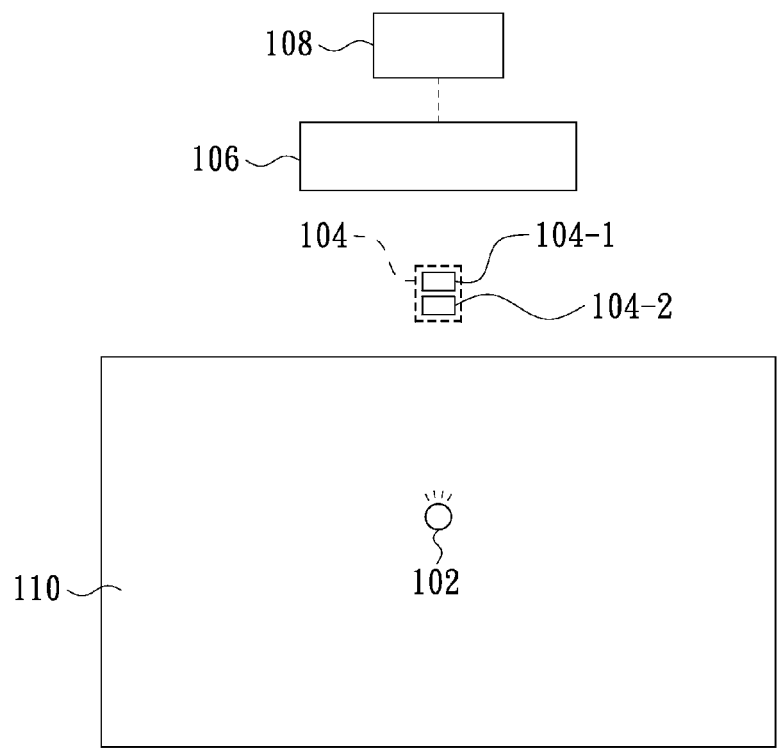
FIG. 1 is a schematic view illustrating a handwriting system in accordance with an embodiment of the present invention.

FIG. 1 is a schematic view illustrating a handwriting system in accordance with an embodiment of the present invention. As shown, the handwriting system in this embodiment includes a light source module 104, an image sensing apparatus 106 and a processing circuit 108; wherein the processing circuit 108 is electrically connected to the image sensing apparatus 106. The light source module 104 is configured to provide a light source for illuminating an object 102 on a plane 110. In this embodiment, the plane 110 has a parallelogram shape, and preferably has a rectangle shape. The plane 110 can be a virtual plane, which is defined by software installed in the processing circuit 108 or defined by specific objects (not shown) disposed at the four corners thereof. Specifically, the plane 110 is parallel to the optical axes of the image sensing apparatus 106.

In this embodiment, the image sensing apparatus 106 is disposed on the light source module 104; and the present invention is not limited thereto. Moreover, the light source module 104 includes a laser light source 140-1 and an optical element 104-2. The laser light source 104-1 is configured to generate a spot light source; and the optical element 104-2 is configured to convert the spot light source into a linear light source serving as the light source of the light source module 104 and illuminating the plane 110 at a specific height. In this embodiment, the optical element 104-2 can be a cylindrical lens or a microelectromechanical system (MEMS) scanning mirror. The cylindrical lens is configured to convert the spot light source emitted from the laser light source 104-1 into the linear light source and thereby forming illuminating the plane 110 at a specific height. The MEMS scanning mirror is configured to modulate the emission direction of the spot light source emitted by the laser light source 104-1, so that the light source of the light source module 104 can scan at a specific height above the plane 110. The light source of the light source module 104 is emitted towards and parallel to the plane 110, such that the entire plane 110 is within an emission range of the light source. In addition, it is to be understood that the laser light source 104-1 can be replaced by an infrared light-emitting diode (IR LED).

The image sensing apparatus 106, disposed on the plane 110, is configured to capture the image of the object 102 reflecting the light source. Specifically, because the side of the object 102 facing the light source can reflect light while being illuminated by the light source, the processing circuit 108 can, after obtaining the image captured by the image sensing apparatus 106, determine the position of the object 102 relative to the plane 110 through the image characteristics and imaging positions of light spots in the captured image; wherein the image characteristic herein includes the image brightness or image size of the object 102.

Figure 2:
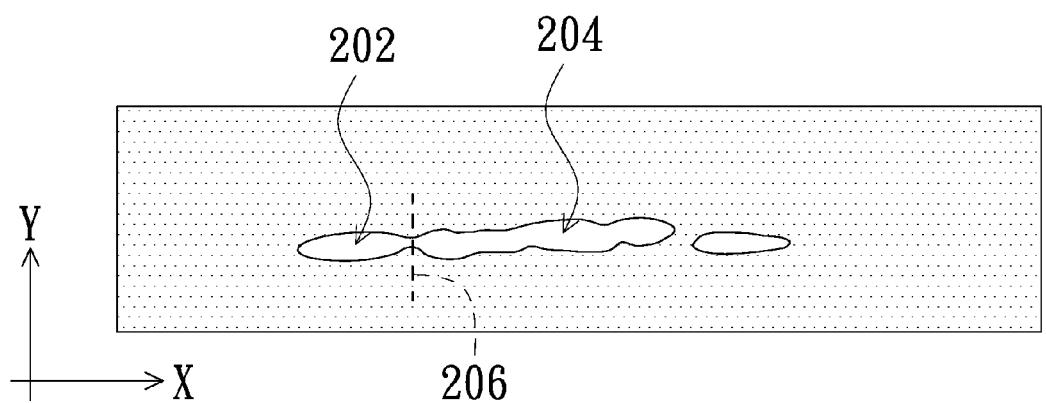
FIG. 2 is a schematic view illustrating an exemplified image of an object captured by the image sensing apparatus shown in FIG. 1.
Figure 3:
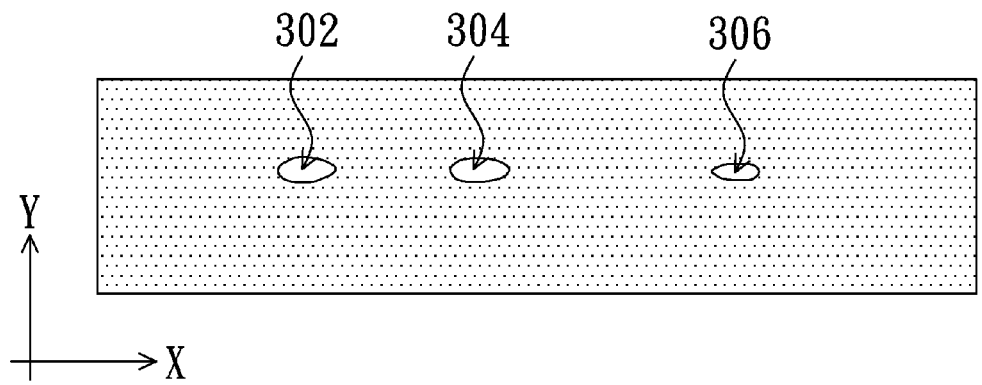
FIG. 3 is a schematic view illustrating another exemplified image of an object captured by the image sensing apparatus shown in FIG.

FIGS. 2 and 3 are two schematic views each illustrating an exemplified image of the object 102 captured by the image sensing apparatus 106; wherein the object 102 herein is a user's right hand on the plane 110 and the direction of the fingertip of each finger is pointing towards the right side of FIG. 1. As shown, the main difference between the two images shown in FIGS. 2 and 3 is the height of the right hand relative to the plane 110. In FIG. 2, the image includes a sub-image 202 of the fingertip of an index finger, which serves as an input indicator, and a sub-image 204 of a palm and thumb, which provide no function in this embodiment; wherein the sub-images 202, 204 are exemplified by being merged together at a position 206. In FIG. 3, the image includes a sub-image 302 of the fingertip of an index finger, which serves as an input indicator, and sub-images 304, 306, which provide no function in this embodiment; wherein the sub-image 302 is not merged with any other sub-image.

Besides receiving the image captured by the image sensing apparatus 106, the processing circuit 108 is further configured to analyze the shape of each of the light spots in the captured image so as to screen out the light spots not qualified to the shape of the object 102. For example, the processing circuit 108 first converts the captured image into a binary image, determines if the captured image has any light spots conforming to the shape of the object 102 by using the Hough Transform, and filters out any light spots not conforming to the shape of the object 102.

As illustrated in FIG. 3, for example, the processing circuit 108 first analyzes if each of the three light spots (or, the three sub-images 302, 304 and 306) in the captured image has an aspect ratio locating within a threshold value, and determines which one of the three light spots is associated with the fingertip of an index finger (or, an input indicator) according to the aforementioned analysis result. It is to be understood that the object 102 can be any specific object, and accordingly the processing circuit 108 is configured to screen the light spots of the image according to the shape feature of the specific object. For example, if the object 102 is a touch pen, the processing circuit 108 may be configured to analyze if the captured image has a light spot with a downward tip (that is, pointing downwards into the X-Y plane shown in FIG. 3).

The processing circuit 108 can be configured to screen the light spots according to the size of the light spot. For example, as illustrated in FIG. 3, the processing circuit 108 can analyze if each of the light spots in the captured image has a size greater than a first threshold value on the y-axis or less than a second threshold value on the x-axis. Specifically, light spots having a size greater than the first threshold value on the y-axis or less than a second threshold value on the x-axis would be considered as non-input indicators. It is to be understood that the processing circuit 108 can screen light spots according to two distinct threshold values on the y-axis and the x-axis, or according to one identical threshold value on the y-axis and the x-axis. In this embodiment, the threshold values each are, for example, a predetermined pixel number.

Moreover, to analyze merged light spots more correctly, for example as illustrated in FIG. 2, the processing circuit 108 may be configured to determine the presence of any light spot having a width at a specific position on the y-axis of less than a threshold value. Specifically, if a merged light spot having a width at a position (e.g., position 206) of less than a threshold is detected, the processing circuit 108 may divide the merged light spot into two individual light spots, and determine if each of the two individual light spots has an image characteristics conforming to the shape and/or size of the fingertip of an index finger (or, an input indicator). In addition, it is to be noted that the processing circuit 108 may screen light spots according to predetermined conditions. For example, the processing circuit 108 may directly consider the light spot on the left as the fingertip of an index finger (or, an input indicator) and calculate the coordinate of the light spot accordingly.

The light spot screening illustrated in FIGS. 2 and 3 is suitable for single touch; however, the present invention is not limited thereto. In other words, the handwriting system according to the present invention is also applicable to multi-touch condition (as illustrated in FIG. 3) if light spot screening is omitted. Therefore, according to the aforementioned description, it is to be understood that the handwriting system of the present invention is minimally influenced by the background light sources.

It is to be noted that the light source module 104 can be replaced with a plurality of laser light sources without employing the optical element 104-2. Specifically, these laser light source are arranged in parallel to each other, thereby forming a light source similar to a linear light source. In addition, the image sensing apparatus 106 and the light source module 104 can be disposed at any corner of the plane 110, and the positions of the image sensing apparatus 106 and the light source module 104 illustrated in FIG. 2 is used for exemplary purposes only.

Figure 4:
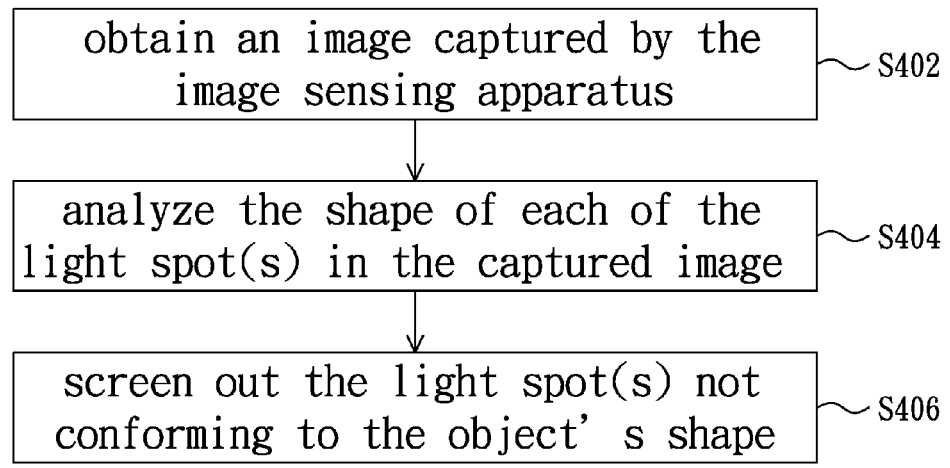
FIG. 4 is a schematic flow chart illustrating an operation method of a handwriting system in accordance with another embodiment of the present invention.

According to the aforementioned description, a person of ordinary skill in the art would be able to summarize some basic operational steps of the handwriting system of the embodiment of the present invention as illustrated in FIG. 4, which is a schematic flow chart illustrating the operational method of a handwriting system in accordance with an embodiment of the present invention. The handwriting system includes a light source module and a light sensing apparatus. The light source module is configured to provide a light source to illuminate an object on a plane. The image sensing apparatus is disposed on the plane and is configured to capture an image of the object reflecting lights emitted by the light source. As illustrated in FIG. 4, the operating method of a handwriting system in this embodiment includes steps of: obtaining an image captured by the image sensing apparatus (step S402); analyzing the shape of each of the light spot(s) in the captured image (step S404); and screening out the light spot(s) not conforming to the shape of the object (step S406).

It is to be understood that the analysis of the light spots in step S404 can be realized by first converting the captured image into a binary image by using the Hough Transform, followed by determining if the binary image has any light spot conforming to the shape of the object.

The Second Embodiment of the Present Invention

The handwriting system in accordance with the second embodiment of the present invention will be described in the following, again with a reference to FIG. 1 due to having a hardware structure similar to that of the handwriting system in accordance with the first embodiment.

Please refer again to FIG. 1. The main difference between the first and second embodiments of the present invention is the operational procedure of the processing circuit 108. Besides receiving the image captured by the image sensing apparatus 106, the processing circuit 108 in this embodiment is further configured to calculate the position of a single object 102 in respective to the plane 110 according to the image characteristics and imaging position of a single light spot in the captured image, or calculate the positions of a plurality of objects 102 in respective to the plane 110 according to the image characteristics and imaging positions of a plurality of light spots in the captured image. In other words, compared with the handwriting system with single touch in the first embodiment, the handwriting system in this embodiment further supports multi-touch functions.

Moreover, the processing circuit 108 in this embodiment can operate in an operation zone converting mode. Specifically, when operating in the operation zone converting mode, the processing circuit 108 would define an indicated operation zone according to four positions on the plane 110; wherein the four positions can be sequentially inputted by one single object 102, or sequentially inputted by two individual objects 102 and each of the two objects 102 is associated with two positions, or inputted simultaneously by four individual objects 102.

Figure 5:
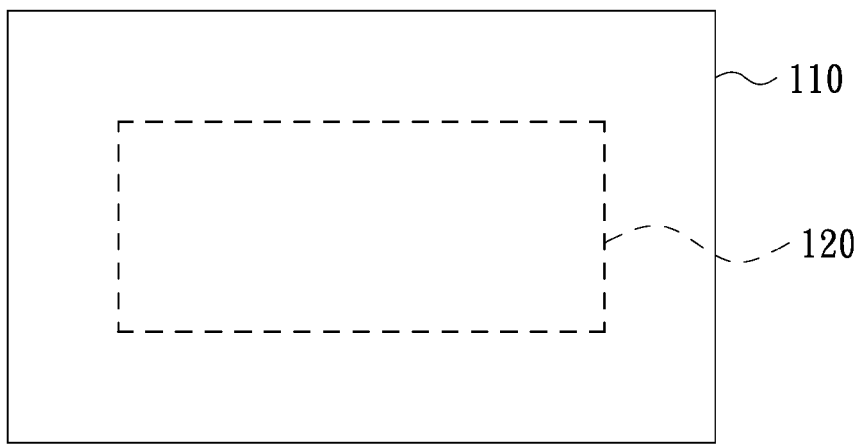
FIG. 5 is schematic view illustrating a plane shown in FIG. 1 and an indicated operation zone defined therein.

FIG. 5 is schematic view illustrating the plane 110 shown in FIG. 1 and an indicated operation zone defined therein. As shown, the processing circuit 108 in the operation zone converting mode first determines the number of objects 102 according to the image captured by the image sensing apparatus 106. If only one object 102 is captured, the processing circuit 108 would define an indicated operation zone 120 on the plane 110 according to four positions (for example, the four corners of the dotted frame) sequentially inputted by the single object 102. If two separate objects 102 are captured, the processing circuit 108 would define an indicated operation zone 120 on the plane 110 according to four positions (for example, the four corners of the dotted frame) sequentially inputted by the two objects 102; and each of the two objects 102 is associated with two positions. Otherwise, if four separate objects 102 are captured, the processing circuit 108 would define an indicated operation zone 120 on the plane 110 according to four positions (for example, the four corners of the dotted frame) inputted simultaneously by the four objects 102.

Once the indicated operation zone 120 is obtained, the processing circuit 108 performs a coordinate transformation by using a matrix operation (for example, a homogeneous matrix operation), so as to map a predetermined operation zone defined on the plane 110 onto the indicated operation zone 120. In other words, while the processing circuit 108 is originally configured to calculate the position of any object 102 in in the plane 110 relative to the plane 110, only the object(s) locating in the indicated operation zone 120 would be calculated by the processing circuit 108 for positioning relative to the indicated operation zone 120, once the processing circuit 108 in this embodiment is in the operation zone converting mode and the operation zone is converted into the indicated operation zone 120. Since the operation zone is adjustable, the handwriting system of the present invention is minimally influenced by the operational environment.

Figure 6:
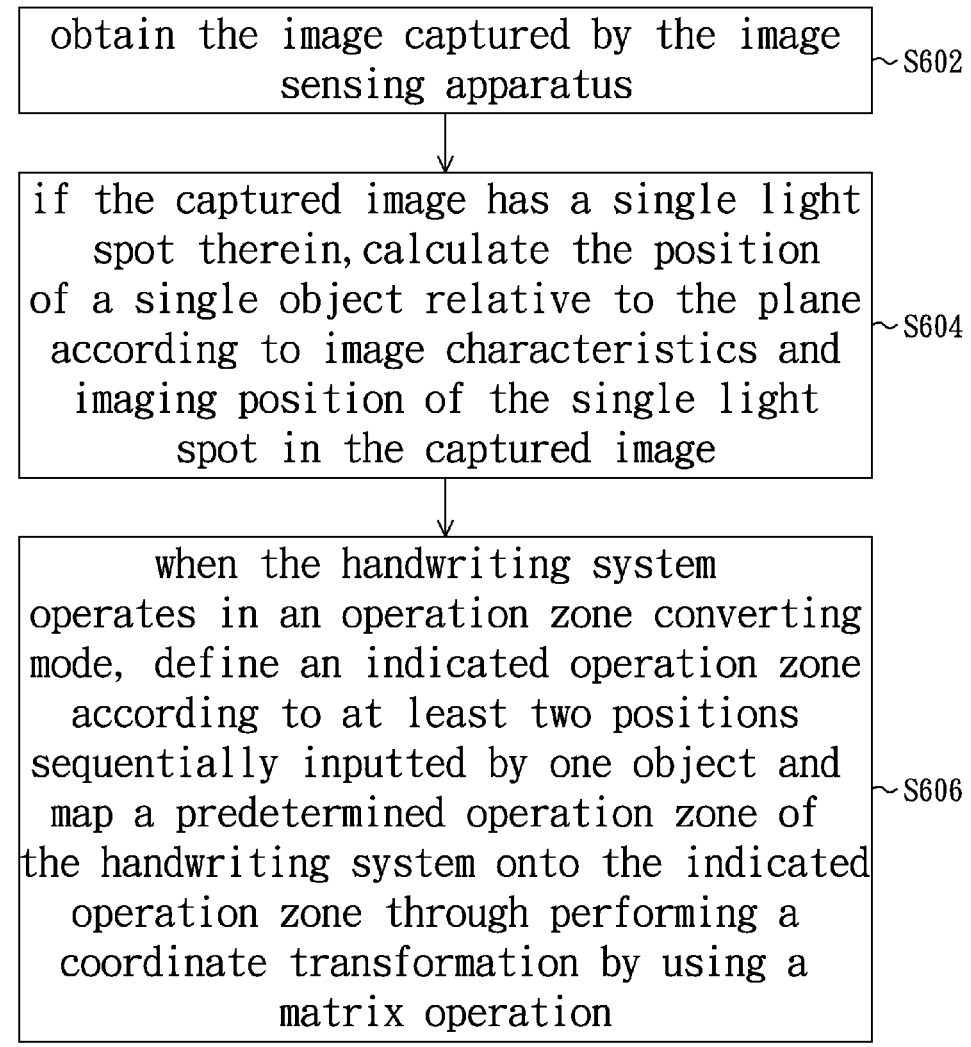
FIG. 6 is a schematic flow chart illustrating an operation method of a handwriting system in accordance with another embodiment of the present invention.

According to the aforementioned, a person of ordinary skill in the art would be able to summarize some basic operational steps of the handwriting system in this embodiment illustrated in FIG. 6, which is a schematic flow chart illustrating an operational method of a handwriting system in accordance with another embodiment of the present invention. The handwriting system includes a light source module and a light sensing apparatus. The light source module is configured to provide a light source to illuminate at least one object on a plane. The image sensing apparatus is disposed on the plane and configured to capture the image of the object(s) reflecting lights emitted by the light source. The operation method includes the steps of: obtaining the image captured by the image sensing apparatus (step S602); if the captured image has a single light spot therein, calculating the position of a single object relative to the plane according to image characteristics and imaging position of the single light spot in the captured image (step S604); and when the handwriting system operates in an operation zone converting mode, defining an indicated operation zone according to at least two positions sequentially inputted by one object and mapping a predetermined operation zone of the handwriting system into the indicated operation zone through performing a coordinate transformation by using a matrix operation (step S606).

Specifically, the coordinate transformation in step S606 can be realized by using a homogeneous matrix operation.

Figure 7:
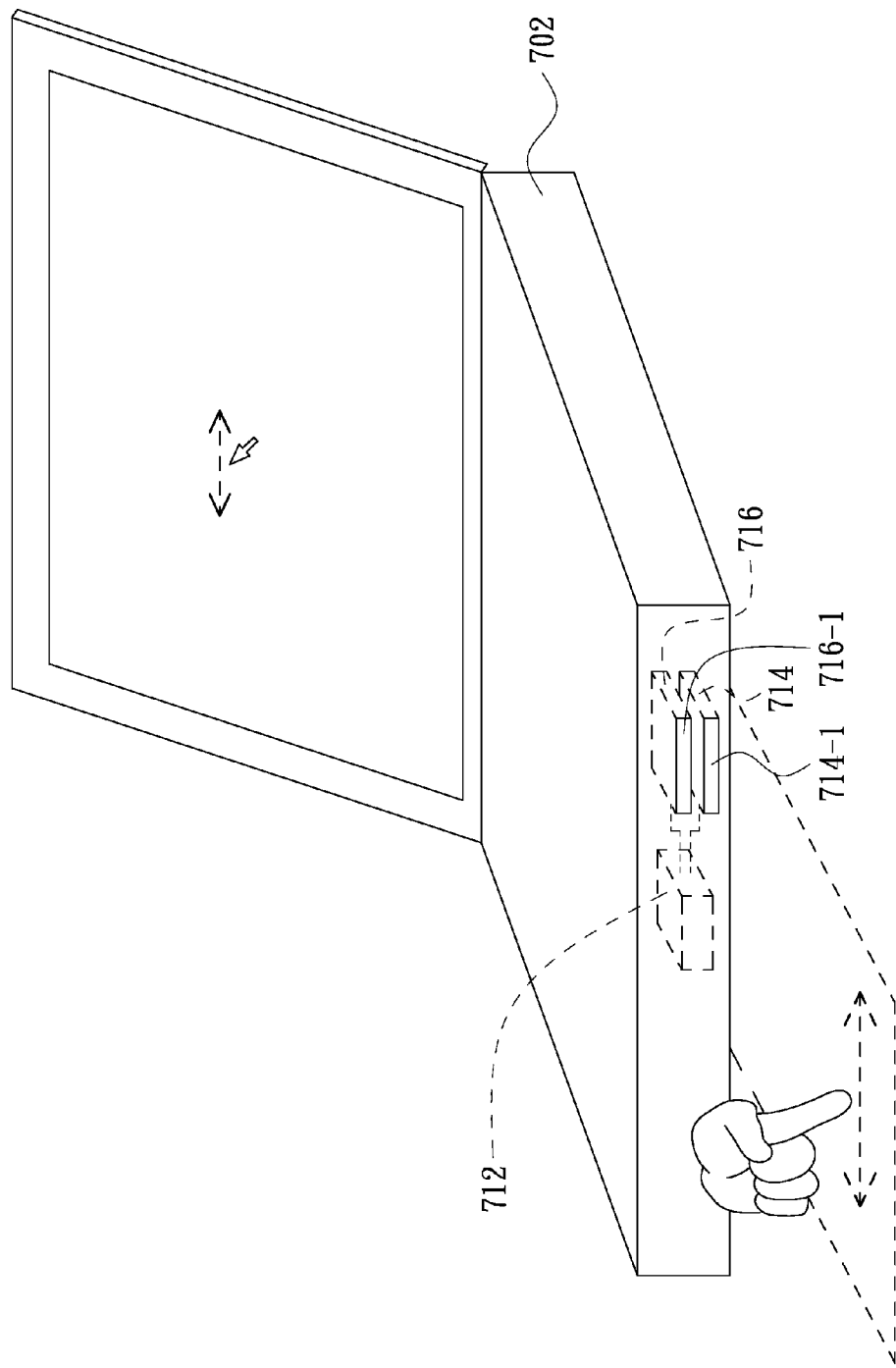
FIG. 7 is a schematic view illustrating the handwriting system of the present invention integrated into a notebook computer.

In particular, it is to be noted that the functions provided by the processing circuit 108 of both the first and second embodiments can be integrated into one single processing circuit, so that the associated handwriting system can be of a complete function and is more competent. Moreover, it is to be understood that the handwriting system of the present invention is integrable into certain electronic apparatuses (for example, notebook computers) or input devices (for example, keyboards). Preferably, the handwriting system of the present invention is integrated into one side of an electronic apparatus or an input device as illustrated in FIG. 7, which is a schematic view illustrating the handwriting system of the present invention integrated into a notebook computer. As shown, the handwriting system is disposed on one side of the notebook computer 702 and includes a processing circuit 712, an image sensing apparatus 714 and a light source module 716. To enable the handwriting system to operate more accurately, it is to be noted that the image sensing apparatus 714 and the light source module 716 are arranged in a way that the sensing surface 714-1 and the emitting surface 716-1 are exposed from the housing of the notebook computer 702, respectively; alternatively, a portion of the housing of the notebook computer 702 corresponding to the sensing surface 714-1 and the emitting surface 716-1 may be transparent.

In summary, the processing circuit of the handwriting system according to the present invention first analyzes the shape of each of the light spot(s) in the image captured by the image sensing apparatus and screens out the light spot(s) not conforming to the shape of the object. Therefore, the handwriting system of the present invention is minimally influenced by the background light sources. In addition, if the captured image contains a single light spot therein, the processing circuit would further calculate the position of the single object relative to the plane according to the image characteristics and imaging position of the single light spot; alternatively, if the captured image contains a plurality of light spots therein, the processing circuit would calculate the positions of the plurality of objects relative to the plane according to the image characteristics and imaging positions of the light spots. Specifically, the handwriting system operating in an operation zone converting mode defines an indicated operation zone according to four positions; wherein the four positions are sequentially inputted by a single object, or by two separate objects and each of the two objects is associated with two positions, or inputted simultaneously by four separate objects. Thereafter, a coordinate transformation is performed on a predetermined operation zone by using a matrix operation, so as to map the predetermined operation zone onto the indicated operation zone. Therefore, the handwriting system of the present invention contains an adjustable operation zone that is minimally affected by the operational environment.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A handwriting system, comprising:
a light source module configured to provide a light source to illuminate an object on a plane;
an image sensing apparatus disposed on the plane and configured to capture an image of the object reflecting lights emitted by the light source; and
a processing circuit electrically connected to the image sensing apparatus and configured to receive the image captured by the image sensing apparatus, analyze a shape of at least one light spot in the captured image, and screen out at least one light spot not conforming to the shape of the object according to an aspect ratio of the at least one light spot in the captured image,
wherein when a merged light spot having a width shorter than a threshold at a position is located, the processing circuit is configured to divide the merged light spot into two individual light spots at the position, and determine whether each of the two individual light spots has image characteristics conforming to the shape of the object.

2. The handwriting system according to claim 1, wherein the processing circuit is further configured to convert the captured image into a binary image and determine if the binary image has at least one light spot conforming to the shape of the object by using the Hough Transform.

3. The handwriting system according to claim 1, wherein the light source module comprises:
a laser source configured to generate a spot light source; and
an optical element configured to convert the spot light source into a linear light source serving as the light source.

4. The handwriting system according to claim 3, wherein the optical element comprises a cylindrical lens or a microelectromechanical system (MEMS) scanning mirror, the cylindrical lens is configured to convert the spot light source into the linear light source serving as the light source, the MEMS scanning mirror is configured to modulate the emission direction of the spot light source and thereby forming the light source.

5. The handwriting system according to claim 1, wherein the light source module comprises:
a plurality of laser light sources arranged in parallel to each other and configured to emit light and thereby forming the light source.

6. The handwriting system according to claim 1, wherein the plane is a parallelogram.

7. The handwriting system according to claim 1, wherein the plane comprises a virtual panel.

8. An operation method of a handwriting system, the handwriting system comprising a light source module and an image sensing apparatus, the light source module being configured to provide a light source to illuminate an object on a plane, the image sensing apparatus being disposed on the plane and configured to capture an image of the object reflecting lights emitted by the light source, the operation method comprising:
obtaining the image captured by image sensing apparatus;
analyzing a shape of at least one light spot in the captured image;
dividing a merged light spot into two individual light spots at a position when the merged light spot having a width shorter than a threshold at the position is located;
determining whether each of the two individual light spots has image characteristics conforming to a shape of the object; and
screening out at least one light spot not conforming to the shape of the object according to an aspect ratio of the at least one light spot in the captured image.

9. The operation method according to claim 8, further comprising:
converting the captured image into a binary image and determining if the binary image has at least one light spot conforming to the shape of the object by using the Hough Transform.

10. A handwriting system, comprising:
a light source module configured to provide a light source to illuminate an object on a plane;
an image sensing apparatus disposed on the plane and configured to capture an image of the object reflecting lights emitted by the light source; and
a processing circuit electrically connected to the image sensing apparatus and configured to receive the image captured by the image sensing apparatus, analyze a shape of at least one light spot in the captured image, and screen out at least one light spot not conforming to the shape of the object according to a size of the at least one light spot in the captured image on y-axis or on x-axis,
wherein when a merged light spot having a width shorter than a threshold at a position is located, the processing circuit is configured to divide the merged light spot into two individual light spots at the position, and determine whether each of the two individual light spots has image characteristics conforming to the shape of the object.

11. An operation method of a handwriting system, the handwriting system comprising a light source module and an image sensing apparatus, the light source module being configured to provide a light source to illuminate an object on a plane, the image sensing apparatus being disposed on the plane and configured to capture an image of the object reflecting lights emitted by the light source, the operation method comprising:
obtaining the image captured by image sensing apparatus;
analyzing a shape of at least one light spot in the captured image;
dividing a merged light spot into two individual light spots at a position when the merged light spot having a width shorter than a threshold at the position is located;
determining whether each of the two individual light spots has image characteristics conforming to a shape of the object; and
screening out at least one light spot not conforming to the shape of the object according to a size of the at least one light spot in the captured image on y-axis or on x-axis.

* * * * *